W. T. WOOD.
VAPOR BURNER.
APPLICATION FILED SEPT. 26, 1921.

1,434,241. Patented Oct. 31, 1922.

Inventor
William T. Wood,
By
Attorney

Patented Oct. 31, 1922.

1,434,241

UNITED STATES PATENT OFFICE.

WILLIAM THOMAS WOOD, OF NASHVILLE, TENNESSEE.

VAPOR BURNER.

Application filed September 26, 1921. Serial No. 503,320.

*To all whom it may concern:*

Be it known that I, WILLIAM T. WOOD, a resident of Nashville, in the county of Davidson and State of Tennessee, a citizen of the United States, have invented certain new and useful Improvements in Vapor Burners, of which the following is a specification.

This invention relates to vapor burners and more especially to that class made up of detachable sections embracing a generator, a mixing chamber, a deflector and a flash pan all carried at the end of a supply pipe and adjacent the vapor outlet and the object of the invention is to thus provide means for vaporizing the fuel and mixing it slowly before supplying the inflammable vapor to the deflecting plate so that a limited and intensified flame will not be provided but one of the large volume is furnished for use in a range or for other heating purposes.

A further object of the invention is the simplifying of its parts and the ease by which they may be separated for repair or cleaning.

These and other objects and details of the said invention are more fully described in the following specification, set forth in the appended claims and illustrated in the accompanying drawings, wherein:

Figure 1:
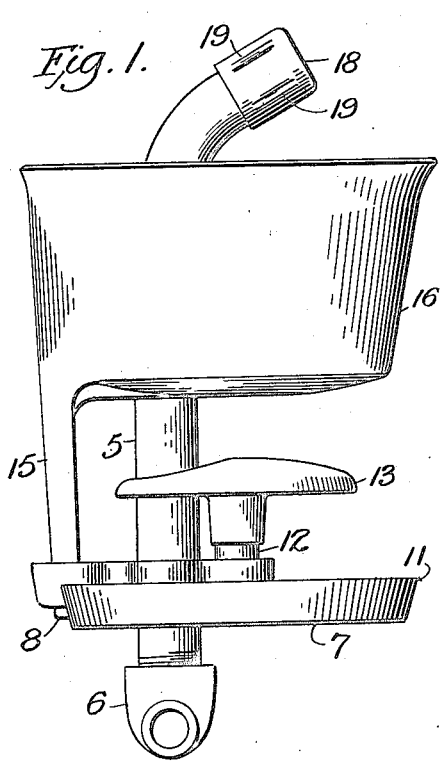
Figure 1 is a side elevation of the improved burner.
Figure 2:
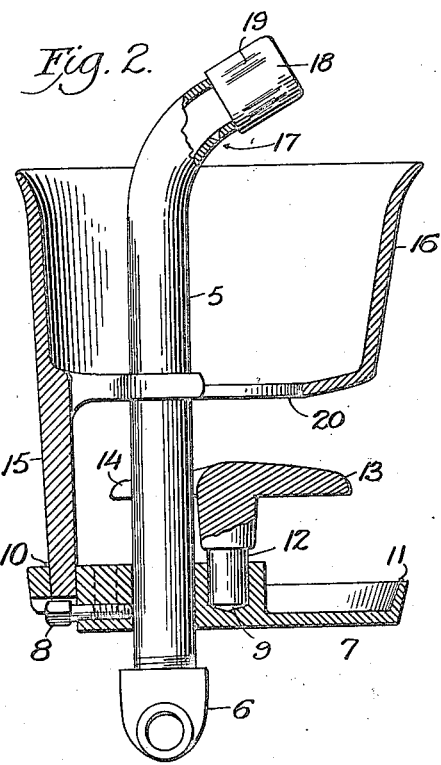
Fig. 2 is a vertical sectional view of the same.
Figure 3:
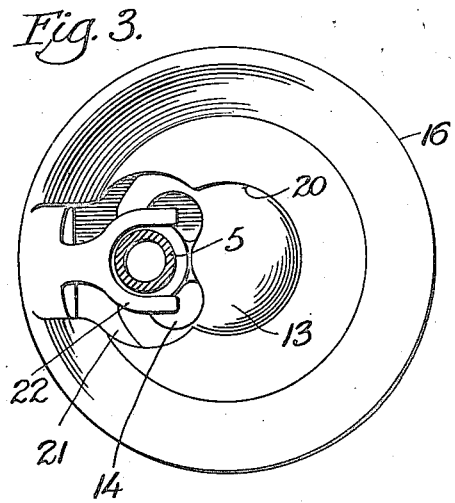
Fig. 3 is a plan view of the burner.
Figure 4:
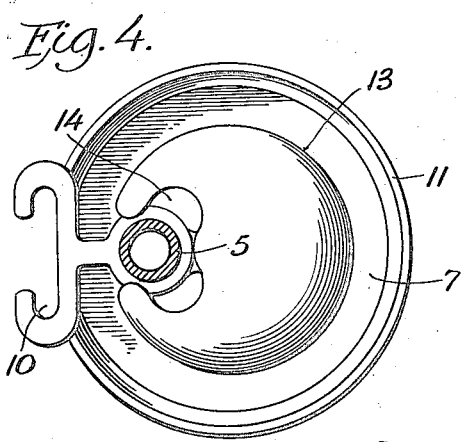
Fig. 4 is a plan view of the deflector and base.

The present invention is designed to generate a vapor from suitable oil, mix the same with air, and deflect and diffuse the ignited mixture for use in a heater.

A generator 5 is adapted by means of the elbow or connection 6 to be secured to a horizontal oil supply pipe that is rigidly located and passed into the heater and a short distance above this elbow is attached a base or flash pan 7 by means of a screw 8 that may also be used to secure proper adjustment.

This pan 7 has a central socket 9 and an elongated socket 10 at its edge, and having the usual flange 11 around its perimeter, and in this pan is placed a small amount of inflammable material to initially heat the fuel in the generator 5.

In the socket 9 is placed the stem 12 of the deflector 13 that has an opening 14 at one side which permits the passage of the generator 5 and the upper surface of said deflector is substantially convex to more effectually shed and radiate the burning vapor.

When this vapor is first generated by the flames in the pan 7 it is lighted by the same, and the vapor flame will heat the pipe 5 and continue the generation of the vapor until the oil supply is shut off.

Supported in the socket 10 is an upright 15 carrying at its upper end a cup 16 in which the upper end of the generator is located and into which the vent 17 discharges. The end of the generator is curved so that the discharge is downward and a cap 18 at said end is fluted or provided with lugs 19 so that the cap may be easily removed to clean the pipe. In the lower side of the cup is a concentric opening 20 somewhat smaller than the deflector and an opening 21 is also provided at one side of the bottom of the cup and about the generator to allow the escape of mixed vapor around the generator to be converted into flame adjacent the deflector to heat the oil in the pipe. The opening 14 also permits of the influence of the flame all along the pipe and above the pan 7.

Within the opening 21 is a fork 22 that braces the cup 16 about the generator 5 and with the aid of the lower tapered end of the support 15 rigidly secures the cup to the structure.

In operation, the jet of vaporized oil is discharged in the cup 16 and takes up its supply of air from the large volume in the said cup and the force of the jet carries the mixture through the opening 20 where it is ignited and deflected, the presence of the large volume of air in the cup results in a comparatively slow mixture of the fluids and obviates the noise resulting from a mixture within a limited space and furnishing a proper burning mixture below the opening 20 where it is consumed.

Another effect resulting from the large mixing cup and deflector is that the flame is not concentrated in one small spot of intense heat that gives results in one corner only of a fire box.

To clean the device, the cup and standard may be removed instantly and the screw 8 readily releases the base 7, from which the deflector is quickly removable. The generator is cleaned by unscrewing it from the elbow 6 and taking off the cap 18, when it will be open at each end and the interior is readily accessible.

It is obvious that the parts may be otherwise arranged or modified without departing from the essential features above described or from the scope of the appended claims.

What I claim as new is:

1. In a vapor burner, the combination of a generator pipe curved at its upper end and having a discharge vent, a mixing cup about the upper end of the generator pipe and having an opening, a support below the cup, a flash pan carrying the support and the generator pipe, and a deflector in the middle of the flash pan and beneath the opening in the mixing cup.

2. In a vapor burner, the combination of a base comprising a flash pan and having a central and a side socket, a deflector located in the central socket, a mixing cup with a depending support adapted to be carried in the side socket, and a generator pipe secured in an opening in the base and passing through openings in the deflector and the mixing cup.

3. In a vapor burner, the combination of a base comprising a flash pan and having an opening near one side, a generator pipe passing through the opening and secured therein, a deflector located in a socket in the center of the base, a mixing cup with a support carried by the base and having an opening above the deflector, and an overhanging upper end to the generator pipe closed by a cap and having a vent adapted to discharge downward through the opening in the mixing cup and upon the deflector.

4. In a vapor burner, the combination of a generator comprising a pipe closed with a cap and having a discharge vent in its curved upper end, a flash pan secured to and carried by the pipe, a mixing cup carried by the flash pan and having openings for the generator and the discharge vapor, and a deflector carried by the flash pan and located below the discharge vent and an opening in the mixing cup.

In testimony whereof I hereunto affix my signature.

WILLIAM THOMAS WOOD.